United States Patent [19]

Cretin et al.

[11] Patent Number: 4,736,346

[45] Date of Patent: Apr. 5, 1988

[54] SYSTEM FOR INTERCONNECTING ELEMENTS OF A RECEIVING DEVICE OF GREAT LENGTH, WHEREBY THE NUMBER OF RECORDING TRACES CORRESPONDING TO THE SENSED SIGNALS CAN BE DOUBLED

[75] Inventors: Jacques Cretin, Le Chesnay; Claude Beauducel, Henouville; Pierre Gonzalez, Rueil Malmaison; Jean Rudaz, Noisy S/Eco., all of France

[73] Assignees: Institut Francais du Petrole, Rueil-Malmaison; Compagnie General De Geophysique, Massy, both of France

[21] Appl. No.: 838,969

[22] Filed: Mar. 12, 1986

Related U.S. Application Data

[63] Continuation of Ser. No. 404,091, Jul. 30, 1982, abandoned.

[30] Foreign Application Priority Data

Jul. 31, 1981 [FR] France .................. 81 15086

[51] Int. Cl.$^4$ .................. G01V 1/22; H04B 3/46
[52] U.S. Cl. ...................... 367/20; 367/76; 178/63 C; 439/623
[58] Field of Search ............. 367/20, 76, 58, 62, 367/154; 178/63 B, 63 C; 174/70 R, 72 R; 339/148

[56] References Cited

U.S. PATENT DOCUMENTS

| | | | |
|---|---|---|---|
| 3,887,897 | 6/1975 | Wertzel et al. | 367/20 |
| 4,041,444 | 8/1977 | Carter | 367/79 |
| 4,041,445 | 8/1977 | Carter | 367/79 |
| 4,146,872 | 3/1979 | Carter | 367/79 |
| 4,148,006 | 4/1979 | Kelw | 367/76 |
| 4,283,778 | 8/1981 | Meyer et al. | 367/76 |
| 4,398,271 | 8/1983 | Cretin et al. | 367/20 |
| 4,497,045 | 1/1985 | Muller | 367/20 |

FOREIGN PATENT DOCUMENTS

| | | | |
|---|---|---|---|
| 7708492 | 2/1978 | Netherlands | 367/76 |
| 2067056 | 7/1981 | United Kingdom | 367/79 |

*Primary Examiner*—Nelson Moskowitz
*Attorney, Agent, or Firm*—Millen & White

[57] ABSTRACT

System for interconnecting elements of a receiving device of great length, for example a seismic streamer, comprising a plurality of data aquisition apparatuses, each of which is adapted to collect 12 separate signals generated by receiver groups distributed in the different elements.

The 12 groups of separate receivers ($R_1$, $R_2$ ... $R_{12}$) are regularly distributed in each element ($T_1$, $T_2$ ... ), forming 6 pairs of groups. A first group of each pair ($R_1$, $R_3$, $R_5$) is connected to an input of an acquisition apparatus ($B_2$). The second group of each pair is connected either to an input of another acquistion apparatus, or to inactive electric connection means ($B_1$, $B_3$) adapted to connect in parallel the second and the first groups of each pair.

This system can be used in seismic prospecting.

5 Claims, 3 Drawing Sheets

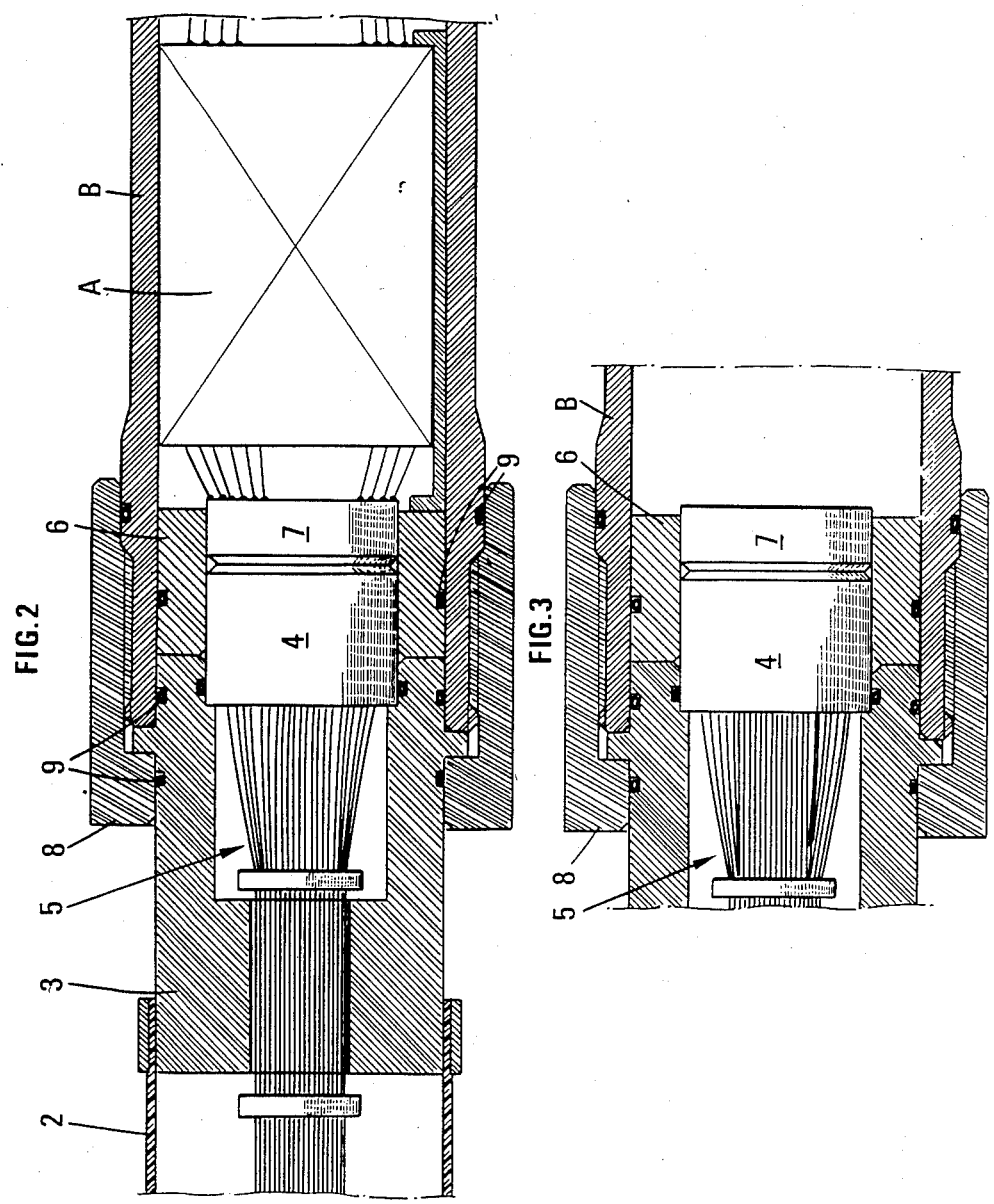

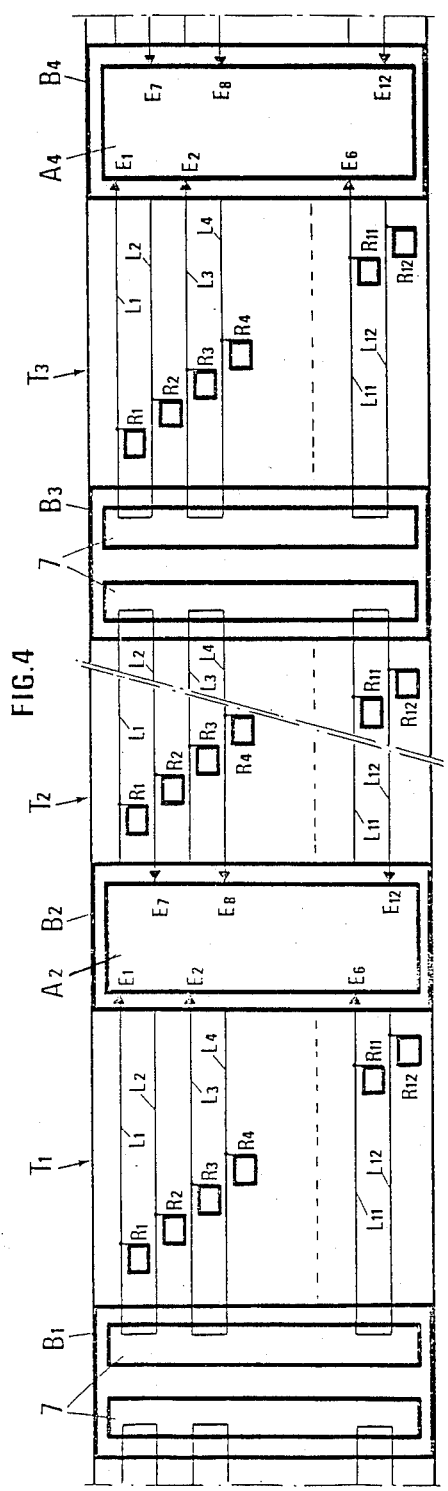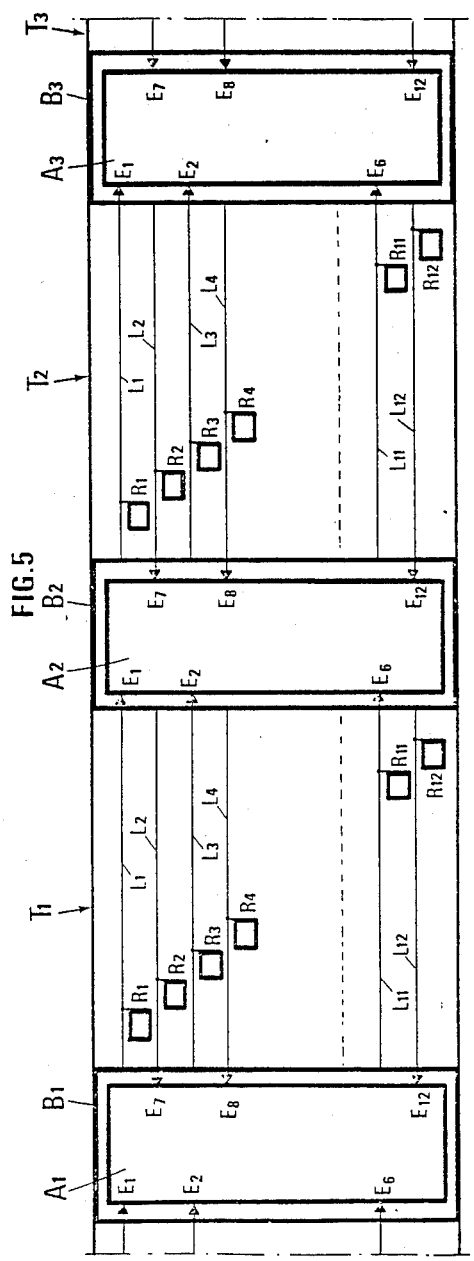

SYSTEM FOR INTERCONNECTING ELEMENTS OF A RECEIVING DEVICE OF GREAT LENGTH, WHEREBY THE NUMBER OF RECORDING TRACES CORRESPONDING TO THE SENSED SIGNALS CAN BE DOUBLED

This is a continuation of application Ser. No. 404,091, filed July 30, 1982 and now abandoned.

BACKGROUND OF THE INVENTION

1. Field of the Invention

This invention relates to a system for interconnecting elements of a receiving device of great length, for example a seismic streamer, whereby the number of recording traces corresponding to the sensed signals can be doubled.

2. Prior Art and Technical Considerations

A seismic streamer is usually formed of a plurality of elements of uniform length, serially interconnected. Each of them comprises a great number of seismic sensors (hydrophones) distributed at regular intervals inside a tight sheath.

The sensors of each element are distributed into a certain number of adjacent groups. Each of these groups is formed of an assembly of consecutive sensors distributed over a determined length of the element, whose outputs are electrically interconnected in series or in parallel and which constitutes a seismic receiver.

When the seismic streamer is towed while immersed, the receivers sense the acoustic waves transmitted from a seismic source triggered from a towing vehicle and reflected or refracted by different sub-terranean layers.

The signals generated by each receiver are transmitted to a recording device placed on the vehicle and form a recording "trace". As the seismic receivers are distributed at regular spacings, usually each recorded signal or recording trace is identified by the length l of the streamer element along which are distributed the interconnected sensors of that particular receiver which has generated said recording trace. When interconnecting the sensors distributed over a length of, for example, 6.25 m, inside a streamer element of 75 m, the latter can generate 12 signals or traces corresponding to sensor groups of 6.25 m, or, briefly stated, 12 traces of 6.25 m. When multiplying by two the number of sensors of each group by interconnecting those which are regularly distributed over a length of 12.5 m, the same seismic streamer element is then capable to generate 6 signals or recording traces corresponding to sensor groups of 12.5 m or, briefly stated 6 traces of 12.5 m.

The seismic signals generated by the different receivers may be transmitted in a continuous manner to the recording system by means of particular transmission lines for each of them. But, in view of the present use of longer and longer seismic streamers, the transmission of the different signals generated by the receivers cannot be ensured simultaneously and continuously, but sequentially by making use of a certain number of common transmission lines. In order to effect this sequential transmission, the different seismic signals generated in each element are collected by electronic data acquisition apparatuses placed at regular intervals inside the seismic streamer or inside tight boxes intercalated between streamer elements. The number and the arrangment of the boxes depends on the number of "traces" which can be generated by the seismic receivers of each streamer element and also on the number of channels which can be connected to each acquisition apparatus.

But, usually, the structure of each element is determined by construction and cannot be changed thereafter, the sensors being grouped and the receivers connected to the different inputs of the acquisition apparatuses located at one or the other end of each element. The number of separate seismic signals sensed by each streamer element cannot be easily modified and, accordingly, the number of recording traces corresponding to the signals received by a seismic streamer cannot be increased but by means of additional streamer elements or by manufacturing another type of streamer elements.

SUMMARY OF THE INVENTION

The interconnection system according to the invention makes it possible, by a succession of simple operations, to double the number of traces corresponding to the signals sensed by a seismic streamer, without modifying the number of elements of which it is composed.

The system according to the invention is applicable, in particular, to a seismic streamer comprising seismic data acquisition apparatuses, each provided with 2n inputs and adapted to collect 2n separate signals generated in operation by seismic receivers (interconnected sensors) placed inside the streamer. It is remarkable in that the receivers of each element are distributed in n pairs of receivers, each of them being electrically connected through a line to both ends of each streamer element and in that a first receiver of each pair is connected through the associated line to the input of a first data acquisition apparatus located at a first end of the element, the second receiver of each pair being connected, through the associated line, either to the input of a second data acquisition apparatus located at the opposite end of the element, or to electric means for connecting associated lines of each pair of receivers, so as to connect the receivers of each pair to the same input of the first acquisition apparatus, the latter being then adapted to collect the signals supplied by all the receivers of the two adjacent streamer elements.

In the first case, to each streamer element correspond 2n recording traces; in the second case the interconnection of the groups of each pair reduces to n the number of traces corresponding to each element, by doubling the length of the traces.

BRIEF DESCRIPTION OF THE DRAWINGS

Other characteristics and advantages will be made apparent from the following description of a non-limitative embodiment of the invention, given with reference to the accompanying drawings wherein:

FIG. 2 diagrammatically shows a connector system for connecting the end of a streamer element to a box containing a seismic data acquisition apparatus;

FIG. 3 diagrammatically shows a connector system similar to that of FIG. 2 wherein a data acquisition apparatus is replaced by an inactive connector adapted to effect, between the conductor wires of the receivers of each pair, the connections shown in FIG. 4;

FIG. 4 shows a part of the interconnection device whereby it is possible to obtain 6 recording traces per streamer element; and FIG. 5 shows a part of the interconnection device whereby it is possible to obtain 12 recording traces per streamer element.

DESCRIPTION OF THE PREFERRED EMBODIMENT

Figure 1:
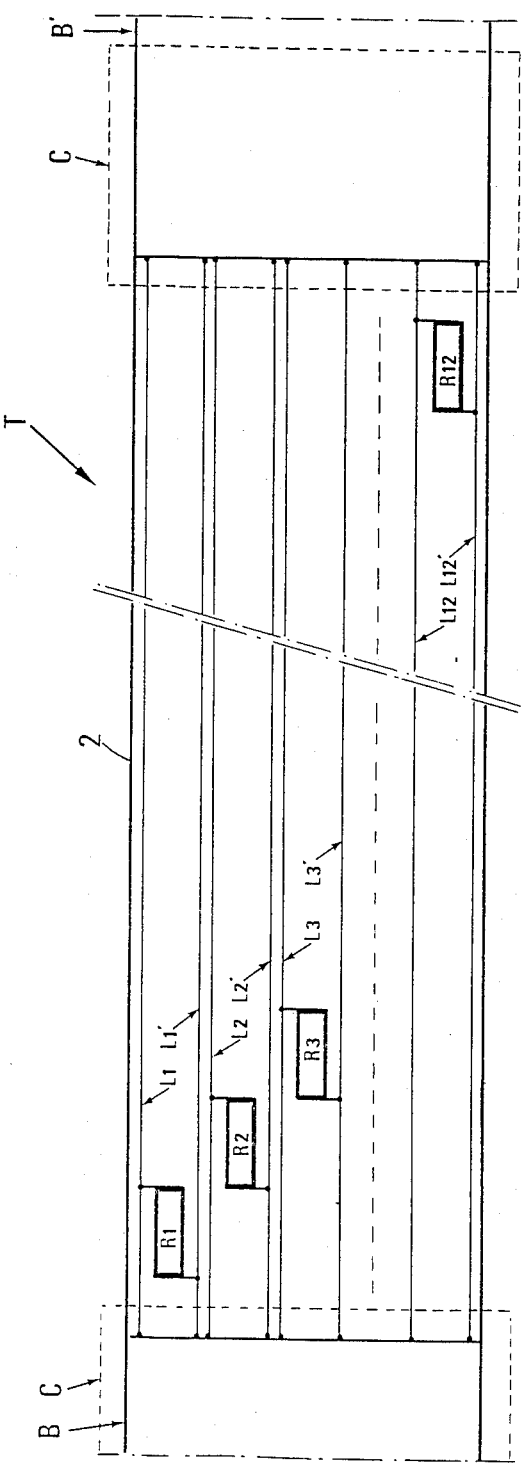
FIG. 1 diagrammatically shows the arrangement of the receivers distributed along a seismic streamer element.

The streamer element T, diagrammatically shown in FIG. 1, comprises twelve seismic receivers symbolized by twelve rectangles $R_1, R_2 \ldots R_{12}$, distributed at regular intervals inside a tight sheath 2. Each receiver is formed, in a known manner, of a certain number (five for example) of seismic sensors, electrically connected to a pair of conductor wires $(L_1, L'_1)$ of the same length as the streamer element (line). Pairs of conductor wires $(L_2, L'_2), (L_3, L'_3), \ldots (L_{12}, L'_{12})$ are respectively connected to the output terminals of receivers $R_2, R_3 \ldots R_{12}$. Each seismic streamer section is connected, at each of its ends, to a cylindrical box B, B', through a connected system C shown in FIGS. 2 and 3, and described below.

This connection system makes possible the simultaneous electrical and mechanical connection of each streamer element with a cylindrical box. B. The end part of each element comprises a terminal piece 3 to which are secured the tight sheath 2 and a female electric connector 4. Onto this connector is welded a bundle 5 of conducting wires comprising twelve pairs of wires $(L_1, L'_1) \ldots (L_{12}, L'_{12})$ connected to the twelve receivers $(R_1, R_2 \ldots R_{12})$ of each streamer element T as well as electric cables feeding the different data acquisition apparatuses distributed along the streamer and data transmission cables interconnecting the successsive acquisition apparatuses. The tubular casing B is closed by a ring 6 at the vicinity of each of its ends. At the center of each ring 6 is secured a male electric connector 7. A threaded ring 8 is adapted to be screwed on the terminal part of each tubular casing B and to rigidy secure the latter to the terminal piece 3 of the corresponding seismic streamer element. Several sealing joints 9, placed inside grooves provided in the different pieces of each connection system, isolate the inside of the streamer from the external medium.

In FIG. 2, the joining pins of the male connector are joined through conducting wires to different selected inputs of a seismic data acquisition apparatus A of known type, described for example in the published French patent application No. 2,471,088 (corresponding to U.S. Pat. No. 4,348,271) and adapted to collect seismic signals generated by twelve different seismic receivers or groups of seismic receivers.

In FIG. 3, the male joining pins are so connected as to interconnect the receivers of each pair as shown in FIG. 4.

FIG. 4 shows the connection for obtaining 6 recording traces (and more generally n traces) from 12 receivers (more generally 2n receivers) container in each streamer section. For sake of clarity of the drawing, the conducting wires $L'_1, L'_2 \ldots L'_{12}$ are not shown. According to this embodiment, two consecutive streamer elements such as $T_1, T_2$ are connected, in the manner shown in FIG. 2, to a box $B_2$ containing a seismic data acquisition apparatus $A_2$. The conducting wires $L_1, L_3, L_5 \ldots L_{11}$ of section $T_1$ are respectively connected to the inputs $E_1, E_2, E_3 \ldots E_6$ of acquisition apparatus $A_2$.

Similarly, conductors $L_2, L_4 \ldots L_{12}$ of the streamer element $T_2$ are respectively connected to the inputs $E_7, E_8 \ldots E_{12}$ of the same acquisition apparatus $A_2$. The other end of each one of elements $T_1$ and $T_2$ is connected, as shown in FIG. 3, to an intermediary box $B_1$, $B_3$. Each of them is provided at each of its ends with a male connector 7 whose joining pins are so interconnected as to serially connect the conducting wires $L_1$ and $L_2$, $L_3$ and $L_4 \ldots L_{11}$ and $L_{12}$ of each of the adjacent elements $T_1, T_2$. The connector 7, provided with appropriate interconnections, forms the electric connection means. Similarly, the next streamer element $T_3$ is connected to one end of the intermediary box $B_3$, having one of its male connectors 7 electrically interconnecting lines $L_1$ and $L_2$, $L_3$ and $L_4 \ldots L_{11}$ and $L_{12}$ contained therein, and to one end of an active box $B_4$ containing a data acquisition apparatus $A_4$. This apparatus is used to collect, on six of its inputs $(E_1, E_2 \ldots E_6)$, the seismic signals sensed by groups of receivers $R_1, R_2, R_3 \ldots R_{12}$, arranged along said streamer section $T_3$ and transmitted through the conducting wires $L_1, L_3 \ldots L_{11}$.

According to this embodiment, the male connectors 7 of the intermiediary boxes such as $B_1$ and $B_3$, make it possible, by appropriate connections, to limit to six the number of receivers and consequently of separate seismic traces corresponding to each streamer element, and accordingly the acquisition apparatuses with 12 inputs, as used, are capable to collect the seismic signals sensed by two consecutive elements.

Accordingly the different elements of the seismic streamer are alternatively interconnected through active boxes $(B_2, B_4 \ldots)$ containing the acquisition apparatuses and through intermediary inactive boxes $B_1, B_3$ . . .

In the mode of connection of FIG. 5, any two streamer elements $T_1, T_2$ are interconnected through a box $B_2$ containing a data acquisition apparatus $A_2$ with 12 inputs $E_1, E_2 \ldots E_{12}$, in the manner shown in FIG. 2. For sake of clarity of the drawings, the wires $L'_1, L'_2, \ldots L'_{12}$ are not shown. The conducting wires $L_1, L_3 \ldots L_{11}$ of element $T_1$ respectively connected to inputs $E_1$, $E_2 \ldots E_6$ of the acquisition apparatus $A_1$, the inputs $E_7, E_8 \ldots E_{12}$ thereof being connected to the conducting wires $L_2, L_4 \ldots L_{12}$ of the adjacent section $T_2$. Similarly, the conducting wires $L_1, L_3 \ldots L_{11}$ of section $T_2$ are connected to the inputs $E_1, E_2 \ldots E_6$ of the next acquisition apparatus $A_2$, interconnecting streamer elements $T_2$ and $T_3$, etc . . .

According to this embodiment the receivers $R_1, R_2 \ldots R_{12}$ of each streamer element are separate. Each element is adapted for the obtainment at the recording of twelve seismic traces of 6.25 m each and accordingly it is necessary to intercalate a box containing a 12 channel data acquisition apparatus between any two successive elements, each of these apparatuses being so arranged as to collect the signals sensed by six receivers of each of the adjacent streamer elements. For compatibility requirements the receivers of each element are distributed in 6 adjacent pairs, the two receivers of each pair being respectively connected to the acquisition apparatuses $A_1$, $A_2$ or $A_2$, $A_3$ ... interconnted to both ends of the elements.

In order to obtain, from a streamer corresponding to n seismic traces per streamer element (n=6 in the present case), a streamer corresponding to 2n seismic traces per element, it suffices merely to remove all the intermediary boxes such as $B_1$, $B_3$ (FIG. 4) and to replace them by active boxes such as $B_2$, $B_4$ containing data acquisition apparatuses (FIG. 5).

What is claimed is:

1. A system including a plurality of elements of an elongate seismic streamer specifically for use in underwater seismic prospecting, an arrangement for interconnecting successive sections of said seismic streamer whereby the number of recording traces corresponding to signals sensed by the seismic streamer can be doubled, and a plurality of data acquisition devices, disposed in active boxes between adjacent sections, each acquisition device being provided with "2n" inputs and arranged to collect "2n" separate signals sensed by receivers of the sections of the seismic streamer, wherein the receivers of each element are divided into "n" pair of receivers, and each receiver is connected through a line to both ends of the associated section, and wherein the arrangement includes first connection means for connecting the line associated with a first receiver of each pair, to an input of a first data acquisition device located in a active box at a first end of the section, and second connection means for connecting the lines associated with the second receiver of each pair to the input of a second data acquisition device located at the opposite end of the section in a second active box wherein the replacement of the second active box containing a data acquisition device by a passive box containing a second connection means provides for the connection of the line associated with the second receiver of each pair to the line associated with the first receiver of said pair and their connection to a common input of the data acquisition device in the first active box.

2. A system including a plurality of elements of an elongate seismic streamer specifically for use in underwater seismic prospecting, an arrangement for interconnecting successive sections of the seismic streamer, whereby the number of recording traces corresponding to signals sensed by the seismic streamer can be doubled, and a plurality of data acquisition devices disposed in active boxes between adjacent sections, each acquisition device being provided with "2n" inputs and arranged to collect "2n" inputs and arranged to collect "2n" separate signals sensed by receivers of the sections of the seismic streamer, wherein the receivers of each element are divided into 'n' pairs of receivers, and each receiver is connected through a line to both ends of the associated section, and wherein the arrangement includes first connection means for connecting the line associated with a first receiver of each pair to an input of a first data acquisition device located at the opposite end of the section.

3. A system according to claim 2, wherein each section of the seismic streamer is provided at each of its end with a terminal piece, and wherein said first and second connection means include female connectors associated respectively with the terminal pieces, said lines passing through the element over its whole length being joined to said female connectors, and male conectors fixed respectively at the ends of a casing, said male connectors having pins that are connected to terminals of a data acquisition device container in the casing.

4. A system including a plurality of elements of an elongate seismic streamer specifically for use in underwater seismic prospecting, an arrangement for interconnecting successive sections of the seismic streamer, whereby the number of recording traces corresponding to signals sensed by the seismic streamer can be doubled, and a plurality of data acquisition devices disposed in active boxes between adjacent sections, each acquisition device being provided with "2n" inputs and arranged to collect "2n" separate signals sensed by receivers of the sections of the seismic streamer, wherein the receivers of each element are divided into "n" pairs of receivers, and each receiver is connected through a line to both ends of the associated section, and wherein the arrangement includes first connection means for connecting the line associated with a first receiver of each pair, to an input of a first data acquisition device located at a first end of the section, and second connection means for connecting the lines associated with the second receiver of each pair to the line associated with the first receiver of said pair, so as to join them to a common input of the first acquisition device, the latter device then being operative to collect the signals supplied by all the receivers of two adjacent sections.

5. A system according to claim 4, wherein each section of the seismic streamer is provided at each of its end with a terminal piece, and wherein said first and second connection means include female connectors associated respectively with the terminal pieces, said lines passing through the element over its whole length being joined to said females connectors, and male connectors fixed respectively at the ends of a casing, said male connectors having pins that are interconnected so as electrically connect the second and the first receivers of each pair of said sections of the seismic streamer.

* * * * *